United States Patent [19]

Verveniotis

[11] Patent Number: 5,453,596
[45] Date of Patent: Sep. 26, 1995

[54] PORTABLE FOOD WARMER/SERVER

[76] Inventor: Nick Verveniotis, 8405 Glenerye, Darien, Ill. 60559

[21] Appl. No.: 251,599

[22] Filed: May 31, 1994

[51] Int. Cl.⁶ .................................................. H05B 3/06
[52] U.S. Cl. ........................ 219/433; 219/436; 219/434
[58] Field of Search ........................... 219/432, 433, 219/434, 436, 438, 435, 429, 441, 442

[56] References Cited

U.S. PATENT DOCUMENTS

| | | | |
|---|---|---|---|
| 1,120,884 | 12/1914 | Ayer | 219/433 |
| 2,678,992 | 5/1954 | Koch | 219/434 |
| 2,873,348 | 2/1959 | Troendly | 219/458 |
| 4,996,410 | 2/1991 | Ho | 219/432 |
| 5,203,257 | 4/1993 | Goad | 219/433 |

*Primary Examiner*—Teresa J. Walberg
*Attorney, Agent, or Firm*—Lockwood, Alex, FitzGibbon & Cummings

[57] ABSTRACT

A portable heating assembly for use in a portable food warmer/server is provided including an electrical heating element supported on a protective rack. Mounting means are provided for detachably mounting the heating assembly to a support member. The heating assembly is adapted to be vertically movable between an upper limit and a lower limit and includes a biasing means for resiliently biasing the heating element in the upper limit.

29 Claims, 4 Drawing Sheets

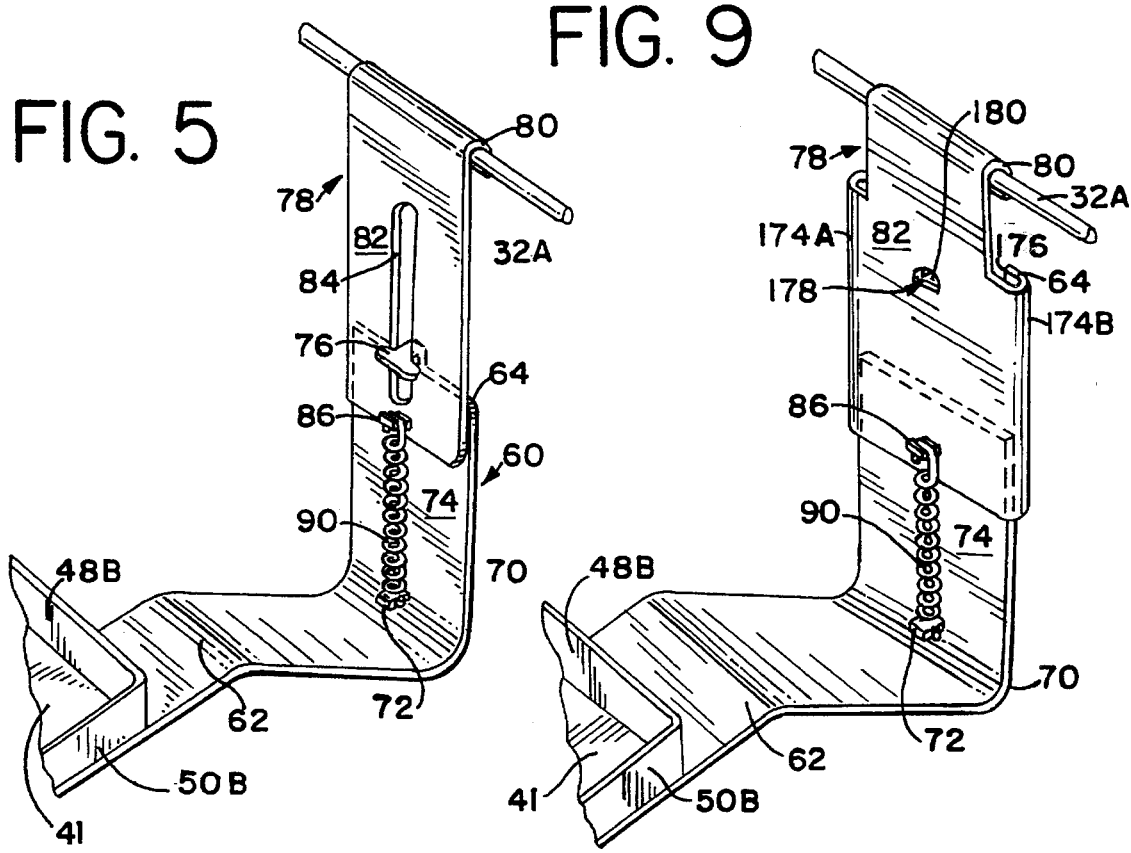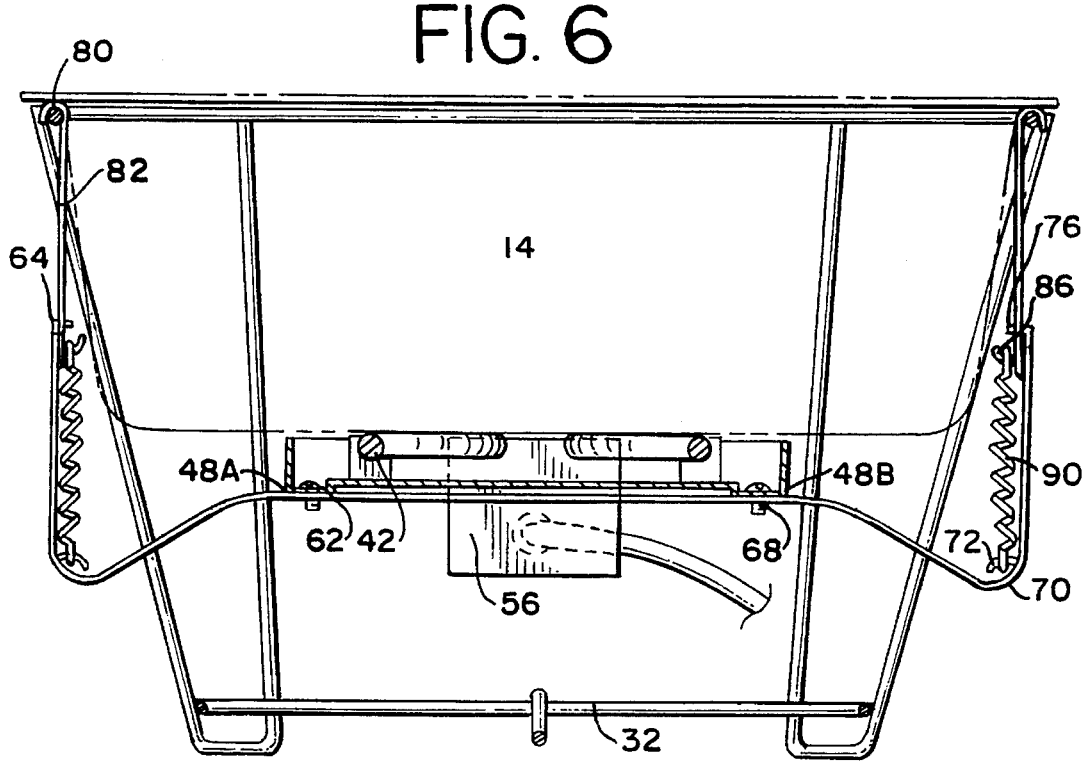

PORTABLE FOOD WARMER/SERVER

The present invention is directed to food warmers in general, and more particularly to a portable heating assembly for use in chafing dishes that utilize heated water to evenly heat food. The invention provides a technical advancement over the art by providing an innovative and portable heating assembly which will keep food warm for extended periods of time and in a variety of food service settings while also being simple, practical and safe in its operation.

BACKGROUND OF THE INVENTION

Chafing dishes are useful in keeping food warm for extended periods of time and in various food service settings. For example, chafing dishes are widely used in buffet style services which may include the service of brunches, hot appetizers and the like. Additionally, chafing dishes are quite portable, adapting them for use in both indoor and outdoor settings and wherever food items require continuous warming.

Chafing dishes have always required a heat source to maintain the food held within the dish at a desired temperature. The most common, if not the exclusive heat source used in association with the chafing dish has been the open flame from a methanol based fuel commercially available in small cans under the Trademark "Sterno". However, the use of combustible fuel has posed several problems. For example, the heat produced by an open flame heat source drops drastically when the fuel level drops to 50% or less. This inherent shortcoming in the use of fuel based heating leads to a significant waste of fuel and provides, at best, an inefficient and economically wasteful heating process.

Additionally, the commonly used fuel is obviously very flammable and can pose a serious fire hazard if proper safety precautions are not constantly employed. Flammable materials such as cloth napkins or paper, plastic or silk flowers, for example, are frequently found at or near the food service area and these materials have been known to ignite when exposed to the open flame used to heat a chafing dish. Moreover, the fuel based heat sources typically used with chafing dishes can be difficult to use under certain conditions. In outdoor settings, for example, an open flame can be easily extinguished by exposure to only a moderate breeze. Hence, the use of these fuel based heat sources has always required constant vigilance to ensure that the flame has not been extinguished or the fuel depleted. The failure to constantly monitor the heat source can lead to the food items being served in a cold condition and, can present health problems if bacteria is allowed to grow to levels which exceed safety limits.

In light of the shortcomings of commercially available fuels for use in the food services industry, it would be desirable to provide a chafing dish with a heat source which could be maintained at a desired temperature while simultaneously avoiding the problems of fuel depletion, safety, and difficulty of use. Most preferably, it would be desirable to provide a chafing dish which could be maintained at a desired temperature and which avoids the use of conventional commercially available combustible fuels. It would also be desirable to provide a portable chafing dish heating unit which can be placed within the conventional frame of a chafing dish stand and wherein the portable heating unit is constructed to be self adjusting and capable of maintaining a heating element adjacent to the bottom of the chafing dish pan to provide adequate heating of the food items within the dish.

It is therefore a general object of the present invention to provide a chafing dish having a portable electric heating assembly.

It is another object of the present invention to provide a portable electric heating assembly for a chafing dish which is easy to operate and which can deliver heat in a consistent manner for long periods of time without constant monitoring by personnel.

It is still another object of the present invention to provide a chafing dish having a portable electric heating assembly which can be used both indoors as well as outdoors and which is relatively inexpensive in its operation.

It is still another object of the present invention to provide a chafing dish and a portable electric heating assembly which is stackable as well as safe to use.

The present invention achieves the aforementioned objects by providing a portable food warmer/server in the form of a chafing dish and a portable electric heating assembly to safely and efficiently maintain the chafing dish at a desired temperature. The portable heating assembly includes an electric heating element which overcomes the problems associated with the use of the above-mentioned conventional fuels. The heating element is capable of providing and maintaining an elevated temperature which is sufficient for both warming food within the chafing dish and for preventing bacterial growth. In this manner, the invention provides both safety and efficiency to the food warming process. The chafing dish includes a pair of nestable thermally conductive pans held in a frame or a support member. The portable heating assembly includes a rack or stand and a heating element carried on the rack. The heating assembly is detachably mounted to the support member and is vertically movable between an upper limit and a lower limit. A biasing means is provided for biasing the heating assembly in its upper limit to ensure that the heating assembly is properly positioned near the bottom of a pan held in the support member. The food warmer/server of the invention may be used indoors as well as outdoors and would make a desirable addition to a household kitchen. It is also contemplated that the invention could be used in a commercial setting as a supplement to a steam table, for example.

For a complete understanding of the present invention, reference is now made to embodiments illustrated in greater detail in the accompanying drawings and described below by way of example. It should be understood that this invention is not limited to the particular embodiments illustrated herein, but is defined by the appended claims.

BRIEF DESCRIPTION OF THE DRAWINGS

FIG. 5 is a perspective view of the attachment portion of the heating assembly made according to the present invention shown partially cut away;

FIG. 6 is a cross sectional view taken along line 6—6 of FIG. 4;

FIG. 9 is a perspective view of another embodiment of the attachment portion of the heating assembly according to the present invention.

DETAILED DESCRIPTION OF THE PREFERRED EMBODIMENT

While the invention may be embodied in a variety of forms and used in different applications, a description of particular embodiments of the inventive concept will be made in the form of food heating/serving dishes commonly referred to as chafing dishes.

Figure 1:
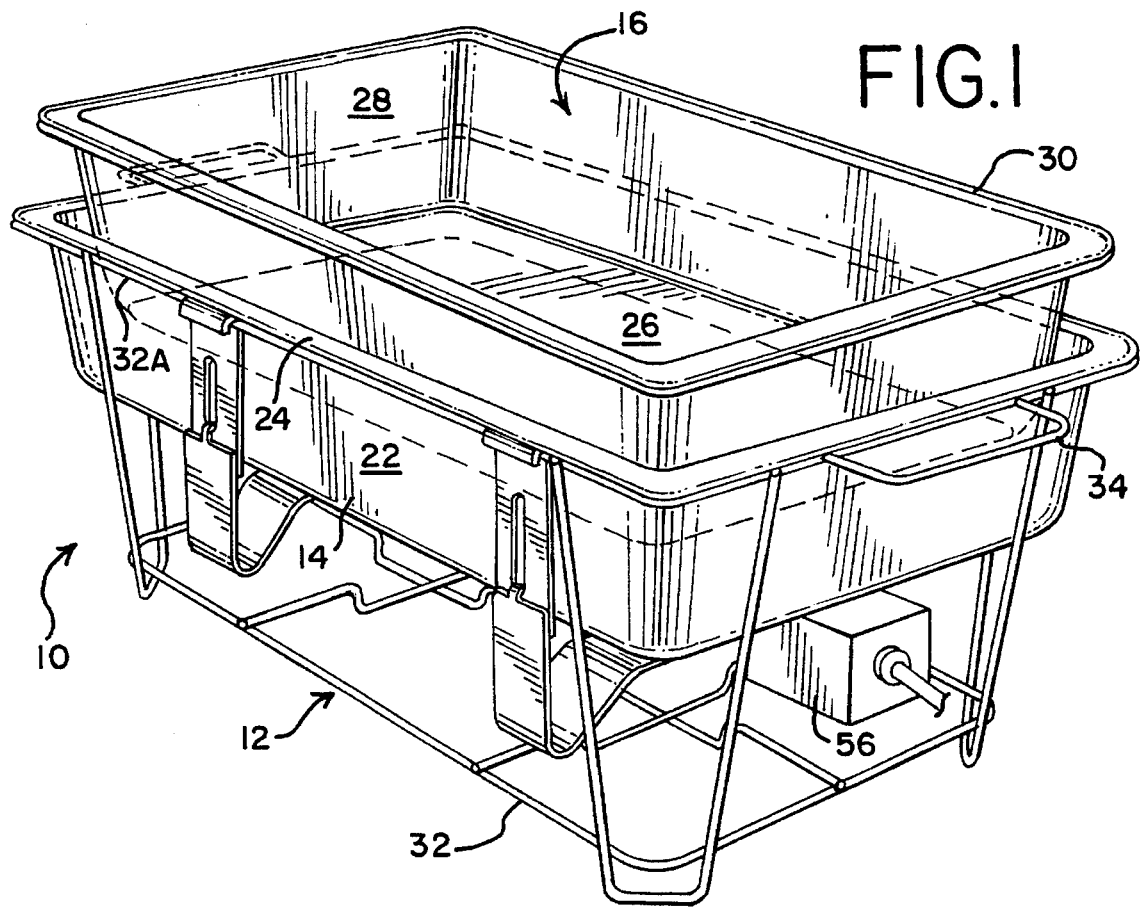
FIG. 1 is a partially exploded perspective view of a food warmer/server utilizing a heating assembly made according to the present invention.
Figure 2:
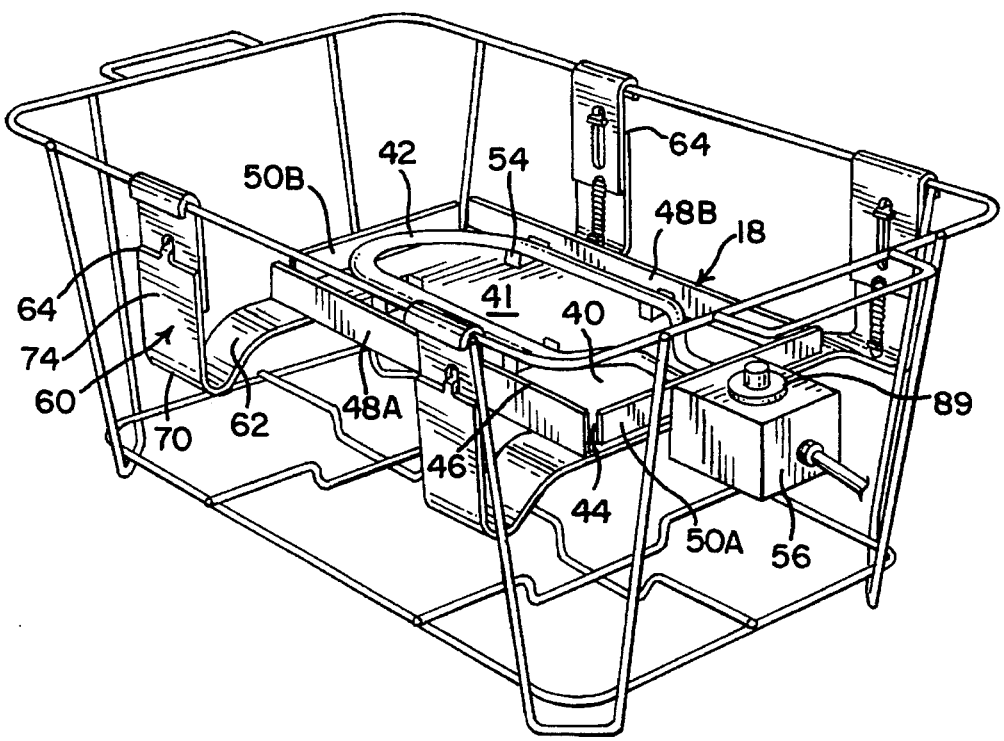
FIG. 2 is a perspective view of a food warmer/server utilizing a heating assembly made according to the present invention with the pans removed.
Figure 3:
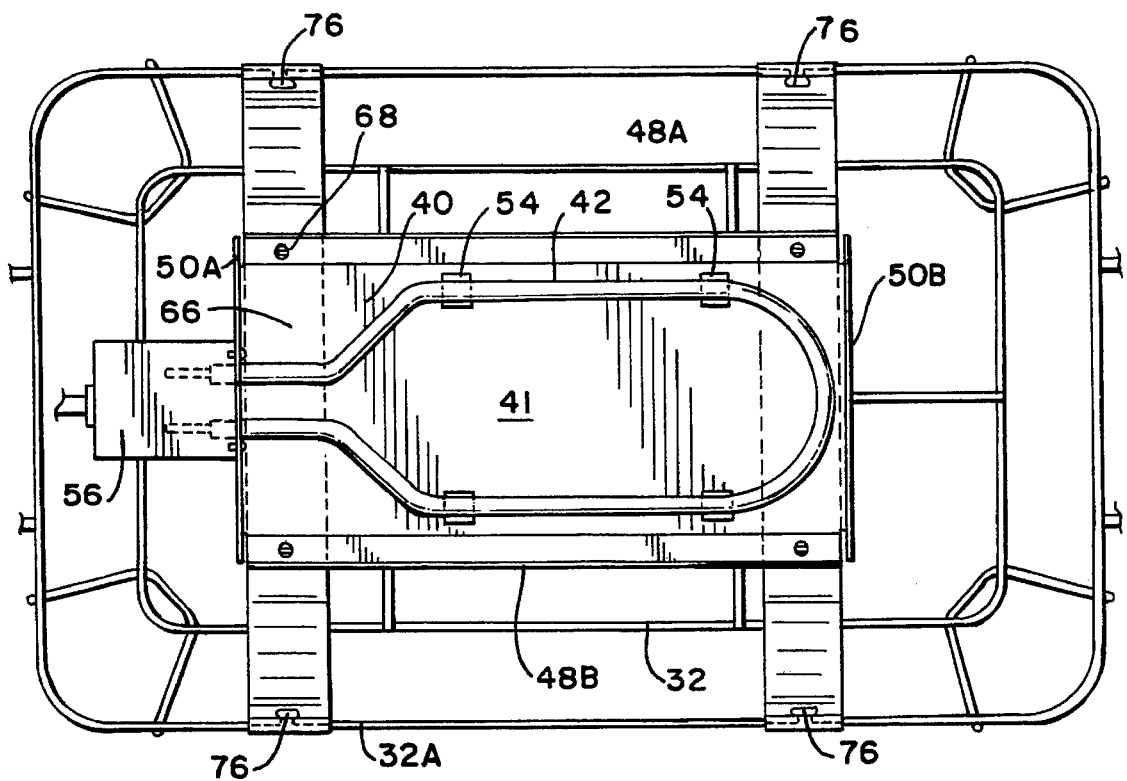
FIG. 3 is a top plan view of the food warmer/server of FIG. 2.
Figure 4:
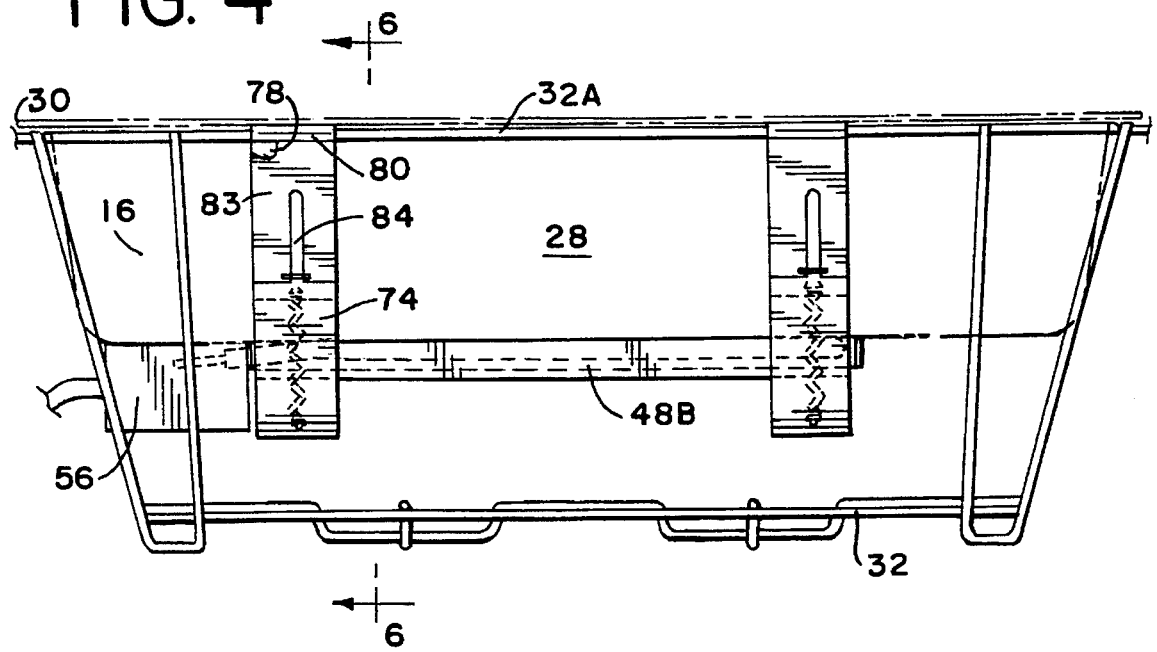
FIG. 4 is a side elevational view of the food warmer/server made according to the present invention utilizing a single pan.

As illustrated in the drawings, the portable food warmer/server, generally designated at 10 made according to the present invention comprises a support member in the form of a base 12, a water supply pan 14, a food serving pan 16, and a heating assembly 18. Water supply pan 14 is of a type commonly used in the food preparation and serving field and is generally rectangular in shape having a bottom wall 20 and four sidewalls 22. Pan 14 includes a peripheral rim 24 extending outwardly and slightly downwardly. Pan 14 is made from a thermally conductive material, such as for example, stainless steel. Stainless steel is generally preferred in the food service industry due to its ability to be easily cleaned and because it generally does not absorb or retain food odors or aromas from food placed in contact therewith. Pan 14 may be of any size, and generally is commercially available in a variety of sizes. In the embodiment shown FIG. 1, for example, the pan 14 is depicted as being "full size". Those skilled in the art will appreciate that a "half size" pan, as well as any other size pan, is within the scope of the invention.

Food serving pan 16 also includes a bottom wall 26 and four sidewalls 28. Pan 16 is shaped and sized similarly to water pan 14 for nested disposition therein. When placed in pan 14, sidewalls 28 and bottom wall 26 are slightly spaced from sidewalls 22 and bottom wall 20 respectively. Pan 16 also includes a peripheral rim 30 shaped similarly as peripheral rim 24 of pan 14 which engages rim 24 to support pan 16 so that its sidewalls 28 and bottom wall 26 are spaced from pan 14. It should be understood that food serving pan 16 and pan 14 may be of any shape including round, oval, square or any other geometric shape. Stainless steel serving and water pans are commercially available in various shapes and sizes, all of which are suitable for use in the present invention. It is not intended that the invention be limited in any way to any particular size or shape for either of the pans 14 and 16.

Base 12 may also be of a commonly available type and includes wire, metal or other suitable material pieces 32 bent and joined or welded together to form a stable support member. Base 12 includes an upper horizontal member shown as wire piece 32A disposed in a generally rectangular shape, and dimensioned so that the bottom wall and sidewalls of water supply pan 14 may be placed interiorly of the wire 32A and further that wire 32A engages the underside of peripheral rim 24 to support it. Base 12 may also include handles 34 disposed on either end formed from wire bent in the shape of a "C" and welded at its ends to wire 32A. It should be understood that the base of the present invention need not be made of the above described wire construction but may be formed in any suitable manner so long as it has handles for portability, a rim for engaging the underside of a peripheral rim of a pan, and a generally open interior area capable of accepting the bottom wall and sidewall of pan 14. In addition, space must also be available in the interior area of the base 12 for the heating assembly 18. Those skilled in the art will appreciate that various known styles and constructions are available for use as a base and, it is contemplated that all such constructions are suitable for use in the present invention.

Heating assembly 18 includes a rack 40 and a heating element 42. Rack 40 comprises a planar piece of sheet metal 41 having slots 44 extending inwardly from edges 46 forming flanges 48A, 48B, and 50A and 50B. The flanges are bent upwardly approximately 90° from sheet 41. Sheet 41 includes a plurality of support tangs 54 cut from sheet 41 and also bent upwardly approximately 90° to support heating element 42. Tangs 54 preferably include a curved edge so the heating element will securely seat thereon. Sheet 41 provides support for heating element 42 and together with flanges 48A, 48B, 50A, and 50B provide a protective barrier to prevent possible burns or injury from occurring by generally shielding the heating element from contact from the bottom and sides. Tangs 54 hold the heating element at a height just slightly greater than the top edges of flanges 48A, 48B and 50A, 50B to position the heating element 42 in close proximity to the bottom of pan 14 when heating assembly 18 is biased against the bottom of pan 14. Heating assembly 18 also includes a housing 56 for protecting an electrical connection between an electrical supply line and the heating element 42. The housing also provides a place to mount a thermostat control 89 of a known type for regulating the temperature of the heating element. The housing includes a removable panel, easily attached by screws or the like for easy access to the interior of the housing for service and which completely isolates the electrical connections. Those skilled in the art will appreciate that heating element 42 is electric and is of a type known in the art.

Heating assembly 18 also includes a mounting assembly 60 for hanging the heating assembly from base 12 and a biasing assembly 62 for biasing the heating assembly 18 vertically upwardly to provide proper positioning between heating element 42 and bottom wall 20 of water supply pan 14 when the pan is carried by base 12. Mounting assembly 60 includes at least a pair of spaced apart support arms 62 spaced apart a length approximately equal to the length of sheet 41. The support arms are generally "C" shaped with two free ends 64 extending vertically upward. Support arms 62 include a planar central portion 66 which is attached to the underside of sheet 41 by any suitable means such as the standard sheet metal screws 68. Alternatively, the support arms may be welded to the sheet 41. Those skilled in the art will appreciate that rather than having only two support arms extending under sheet 51, four separate support arms separately connected to sheet 41 at its periphery may be utilized.

Support arms 62 extend outwardly and slightly downwardly from the central planar portion and then curve upwardly to vertically extending end portions 74 which are approximately perpendicular to the central portion and extend to free ends 64. Associated free ends 64 should be spaced apart a distance approximately equal to the width of base 12 measured across upper wire piece 32A.

Curved portion 70 adjacent each perpendicularly extending portion of the support arm includes a hook 72 extending inwardly and downwardly punched from support arm 62. Free ends 64 include a "T" shaped tab 76 extending inwardly and approximately perpendicular to end portion 74. Mounting assembly 60 also includes a plurality of clips 78 having a curved portion 80 at one end for engaging wire 32A and a planar portion 82. Planar portion 82 includes a longitudinally extending slot 84 having a width less than the width of tab 76. The planar portion 82 includes an inwardly and upwardly extending hook 86 punched from clip 78 on the end opposite curved portion 80.

Tab 76 of each of the free ends 64 are positioned to slidably engage one side of planar portion 82 between the top and bottom of each of the slots 84. Because the tab is wider than the slot, the tab 76 engages one side of planar portion 82, preventing tab 76 from being withdrawn through slot 84. Tab 76 is therefore movable vertically in slot 84 between the top of slot 84 and the bottom. A spring 90 is provided and is connected at one end to hook 72 and at the other end to hook 86. The spring biases the support arms and particularly tab 76 in the upper extent of slots 84. In the described embodiment, four support clips 78 are illustrated engaged to wire 32A. However, any number of support clips and associated support arms 62 may be utilized depending on the shape of the food serving pan utilized to generally provide uniform support of heating assembly.

When heating assembly 18 is used in conjunction with a base 12, the heating element 42 and rack 40 are positioned in the interior of base 12. Curved portion 80 of clips 78 engage wire 32A to support the rack and heating element. It should be understood that other easily detachable fastening members may be utilized to support the heating assembly on the base 12. When positioned on the base 12, springs 90 bias support arms and associated tabs in the upper portion of slots 84. This in turn biases heating element 42 in its upper limit approximately 2 inches below wire 32A. However, slots 84 may be fashioned to permit heating element 42 to be biased upwardly to any desirable height to accommodate pans having a depth of less than 2 inches. This may be convenient when utilizing the heater assembly to heat a shallow food serving pan without a water supply pan.

FIG. 9 illustrates an alternate preferred embodiment for the mounting assembly 60. In this embodiment, the planar portions 82 include laterally spaced wings or rails 174a and 174b along the vertical edges of portion 82. The wings 174 are curved so their vertical edges 176a face each other. In this arrangement, the wings 174 form a track to receive the vertical edges of the end portions 74 on the support arms 62 therein. This track guides the vertical movement of the end portions 74 with respect to the planar portions 82 of clips 78 to prevent lateral movement between the clips 78 and the end portions 74 when the assembly 18 is being properly positioned with respect to the water pan 14, for example. The end portions 82 are provided with a tab/stop generally indicated at 178 which protrudes through the end portion 82 to form a stop member 180 preferably oriented to be perpendicular with the planar surface of the portion 82 between the vertical edges 176. In this arrangement of In this arrangement of parts, the planar portions 82 and the end portions 74 move with respect to each other within the track formed by rails 174. The spring member 90 biases the relative movement between the portions 82 and 74 in a known manner and the tab 180 serves to stop the upward advancement of the portion 74.

An important aspect of the present invention is that the heating element is biased to its upper limit, thereby positioning the heating element adjacent to the water supply pan or food pan. This provides an evenly heated serving pan and efficient heating. In some instances, it may be desirable to position the heating element 42 to engage or contact the bottom of the water pan 14. However, the invention is not to be so limited and, it is contemplated that positioning the element 42 near the bottom of the pan 14 is within the scope of the invention so long as the pan 14 and the water therein are sufficiently heated to maintain food within the pan 16 at a desired temperature. In addition, another important aspect of the present invention is that the heating assembly is completely portable and may be used on any number of support members. This is extremely advantageous where, for example, a heating assembly is inoperative, a replacement heating assembly may be easily substituted.

Figure 7:
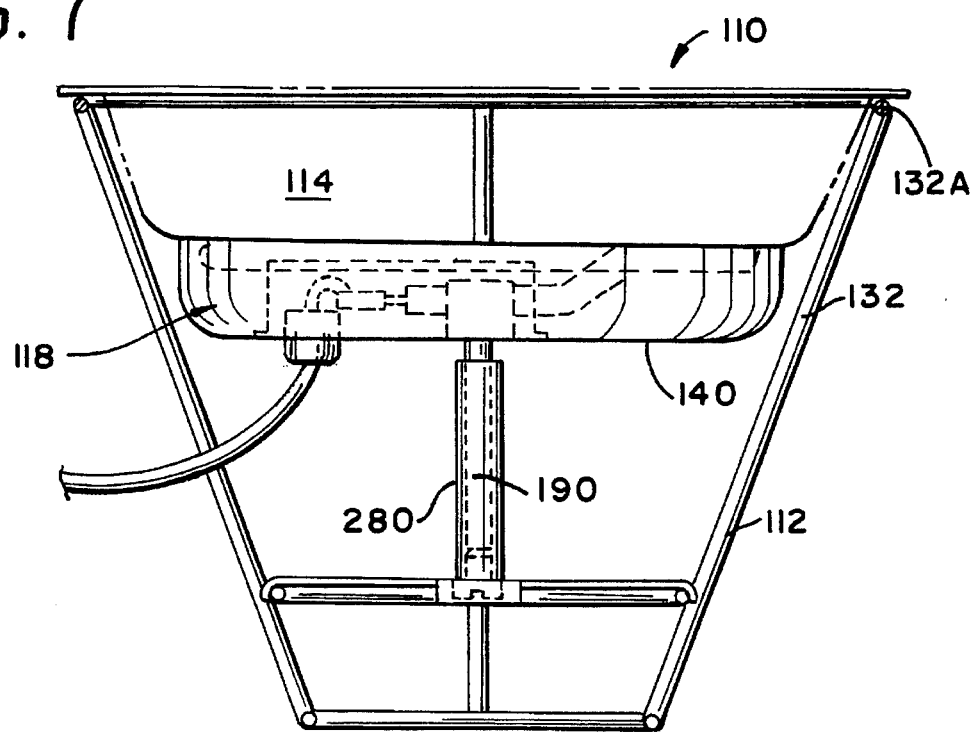
FIG. 7 is a front elevational view of a round food server/warmer made according to the present invention.
Figure 8:
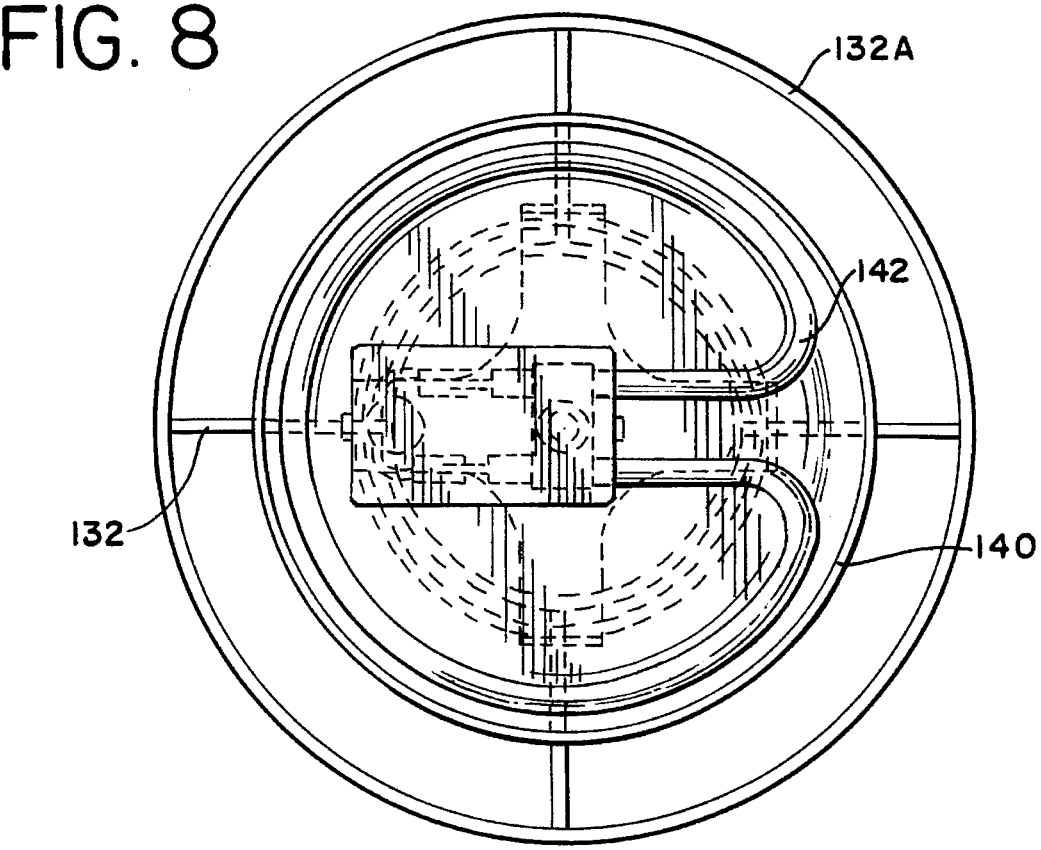
FIG. 8 is a top plan view of a round food server/warmer made according to the present invention with the pans removed.

An alternative embodiment of the present invention is shown in FIGS. 7 and 8, including a support member in the form of a round base 112, a water supply pan 114, a food supply pan not shown, and a heating assembly 118. The alternative embodiment food warmer/server 110 operates substantially in the same manner as the preferred embodiment. Base 112 is generally circular and includes wire or other suitable metal pieces 132 bent and welded together to form a stable support member. Base 112 may be made in any geometric shape so long as it includes a substantially planar support portion such as, for example, wire 132A adapted to support the peripheral rim of a similarly shaped pan and other support members such as, for example, a table having a hole cut therein shaped substantially similar to the periphery of a pan to be supported so as to engage the peripheral rim of such pan. Cooperation between the water supply pan 114 and food supply pan 116 is similar to that described with respect to the preferred embodiment with pan 116 sized and shaped for nested deposition in pan 114.

Heating assembly 118 includes a rack 140 and a heating element 142. Both rack 140 and heating element 142 are configured to substantially conform to the shape of the bottom wall of water pan 114, which in the embodiment illustrated in FIGS. 7 and 8 is circular. Heating assembly may be held in place with a plurality of support arms 62 which cooperate with support clips 78 as described above. Alternatively, and as illustrated in FIG. 7, heating assembly 118 may be supported by a support member 200 centered and disposed under rack 140. Support member 200 is biased upwardly by a compression spring 190. Upwardly biased support member 200 in turn upwardly biases the heating assembly 118 to position the assembly 118 adjacent to the bottom wall of water pan 114. It will be understood that the heating assembly 118 may also be positioned adjacent to the bottom wall of a food pan and in the absence of water pan 114.

Heating assembly 18 may generally be of any geometric shape to engage a similarly shaped pan. When other than rectangularly shaped pans are utilized, rack 140 should be shaped similarly to the pan utilized and evenly supported about a similarly shaped base by a plurality of support arms. In such a case, it may be necessary to utilize support arms 62 that are individually attached to rack 140 and include a single free end as described above.

It will thus be seen that the present invention provides a new and useful portable heating assembly and food warmer/server assembly having a number of advantages and characteristics, including those pointed out herein and others which are inherent in the invention. Preferred embodiments of the invention have been described by way of example, and it is anticipated that modifications may be made to the described form without departing from the spirit or scope of the invention as defined in the appended claims.

What is claimed is:

1. A portable food warmer/server comprising: a first upwardly opening thermally conductive pan; a second thermally conductive pan dimensioned for nested disposition within said first pan; a support member engaging a portion of the underside of said first pan for supporting said first pan and said second pan; a heating assembly including a rack and a heating element carried on said rack, said heating assembly detachably mounted to said support member and being vertically movable between an upper limit and a lower limit; and biasing means for resiliently biasing said heating assembly in its upper limit to position said heating element in close proximity to said first pan.

2. The portable food warmer of claim 1, wherein said heating element generates heat by electrical resistance.

3. The portable food warmer of claim 1, further including a thermostatic means for controlling the heat output of said heating element.

4. The portable food warmer/server of claim 1, wherein said first pan includes an upwardly opening well of a predetermined depth and said second pan includes an upwardly opening well of a depth less than said predetermined depth.

5. The portable food warmer/server of claim 1, wherein said first pan is made from stainless steel.

6. The portable food warmer/server of claim 1, wherein said second pan is made from stainless steel.

7. The portable food warmer/server of claim 1, wherein said heating assembly is detachably mounted to said support member by a plurality of support clips adapted to removably engage said support member, said clips including longitudinally extending slots, a plurality of support arms having two free ends, each of said support arms having a portion connected to said rack and each having a flange at the two free ends, wherein said flanges are adapted to ride in said slots.

8. The portable food warmer/server of claim 7, wherein said upper limit is defined by the uppermost end of said slots and said lower limit is defined by the lowermost end of said slots opposite said uppermost end.

9. The portable food warmer/server of claim 7, wherein said biasing means includes a plurality of springs connected between each of said clips and each of said support arms.

10. The portable food warmer/server of claim 1, wherein said biasing means includes a compression spring mounted between said rack and said support member for biasing said rack and heating element in said upper limit.

11. The portable food warmer/server of claim 1, wherein said heating assembly when disposed in said upper limit is sufficiently high enough to contact the bottom of said first pan when said first pan is disposed in said support member.

12. A portable heating assembly for use with a food warmer/server including a first thermally conductive pan having a peripheral rim, a second thermally conductive pan having a peripheral rim and sized and shaped for nested disposition in said first pan wherein said peripheral rim of said second pan overlies the peripheral rim of said first pan and is supported thereon and a support member for engaging the underside of the peripheral rim of said first pan for supporting said first and second pans, said portable heating assembly comprising: a rack, a heating element carried on said rack, said heating assembly vertically movable between an upper limit and a lower limit; a mounting assembly adapted to detachably connect said heating assembly to said support member, said mounting assembly including positioning means to position said heating assembly in its upper limit to thereby maintain said heating element and said first pan.

13. The portable heating assembly of claim 12, wherein said mounting assembly includes a plurality of support clips including a planar portion and a curved portion adapted to removably engage said support member, said clips having slots extending substantially the length of said planar portion, a plurality of support arms each connected to said rack and each having a flange adapted to ride in said slots of said support clips.

14. The portable heating assembly of claim 13, wherein said upper limit is defined when each of said flanges are disposed in the uppermost portion of said slots and said lower limit is defined when each of said flanges are disposed in the lowermost portion of said slots.

15. The portable heating assembly of claim 13, wherein said heating assembly is biased in its upper limit by a plurality of springs connected between each of said support clips and each of said support arms.

16. The portable heating assembly of claim 12, wherein said heating assembly is biased in its upper limit by a plurality of springs disposed on said mounting assembly.

17. The portable heating assembly of claim 12, wherein said heating assembly is biased in its upper limit by a spring mounted between said rack and said support member.

18. The portable heating assembly of claim 12, wherein said upper limit is of sufficient height to allow said heating assembly to contact the bottom of said first pan when said first pan is disposed in said support member.

19. The portable heating assembly of claim 12, wherein said heating element generates heat by electrical resistance.

20. The portable heating assembly of claim 12, further including a thermostat for controlling the heat output of said heating element.

21. A portable heating assembly for use in warming food, comprising: a rack; an electric heating element carried on said rack; a mounting assembly carrying said rack, said mounting assembly including a support arm extending beneath said rack and adapted to be releasably attached to a support member positioned above said rack, said mounting assembly further including biasing means associated with said support arm to vertically position said heating element between an upper limit and a lower limit when said mounting assembly is attached to said support member.

22. The portable heating assembly of claim 21, wherein said mounting assembly includes a plurality of support clips including a planar portion and a curved portion adapted to removably engage said support member, said clips including slots extending substantially the length of said planar portion, a plurality of support arms each connected to said rack and each having a flange slidably connected to said support clips and adapted to ride in said slots of said support clips.

23. The portable heating assembly of claim 22, wherein said heating assembly is biased in its upper limit by a plurality of springs connected between each of said support clips and each of said support arms.

24. The portable heating assembly of claim 21, wherein said rack includes a planar portion having upturned flanges about its periphery and a plurality of support tangs adapted to support said heating element.

25. The portable heating assembly of claim 24, wherein said tangs include an arcuate edge.

26. The portable heating assembly of claim 21, wherein said heating assembly is biased in its upper limit by a spring mounted beneath said rack.

27. The portable heating assembly of claim 21, wherein said upper limit is of sufficient height to allow said heating assembly to contact the bottom of a food pan when said pan is disposed in said support member.

28. The portable heating assembly of claim 21, wherein said heating element generates heat by electrical resistance.

29. The portable heating assembly of claim 21, further including a thermostat.

* * * * *